July 11, 1933.  S. RHEA  1,918,132

RAZOR BLADE SHARPENER

Filed March 25, 1932  3 Sheets-Sheet 1

Inventor
Samuel Rhea
By Clarence A. O'Brien
Attorney

July 11, 1933.　　　　　　S. RHEA　　　　　　1,918,132
RAZOR BLADE SHARPENER
Filed March 25, 1932　　　3 Sheets-Sheet 2
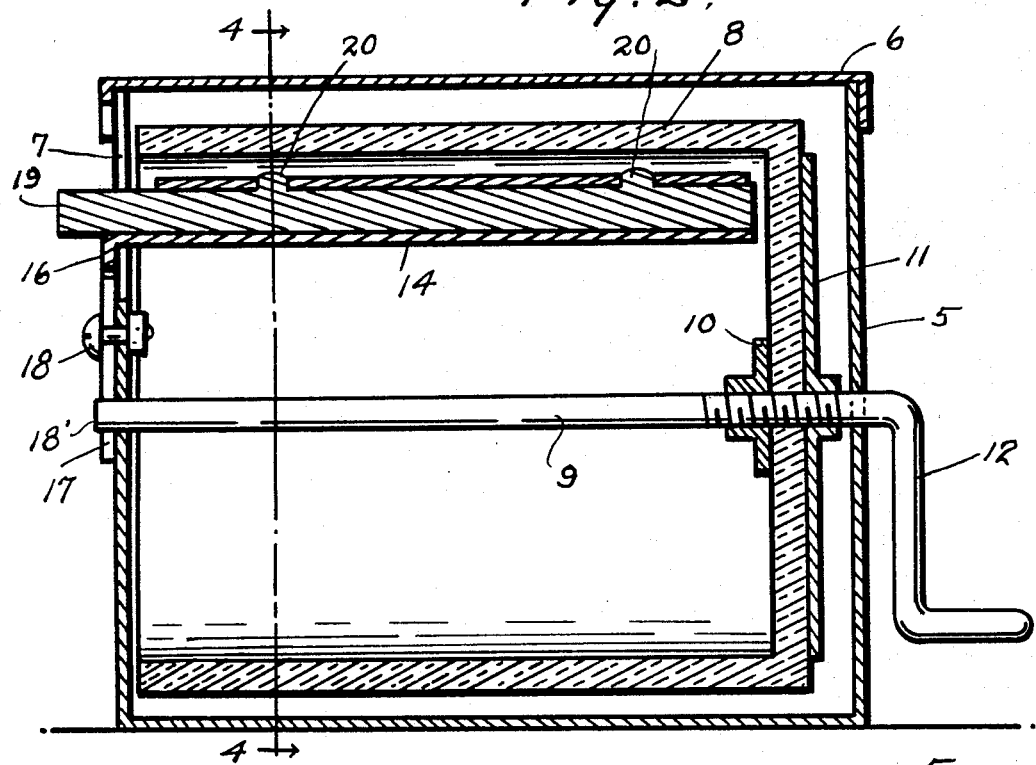
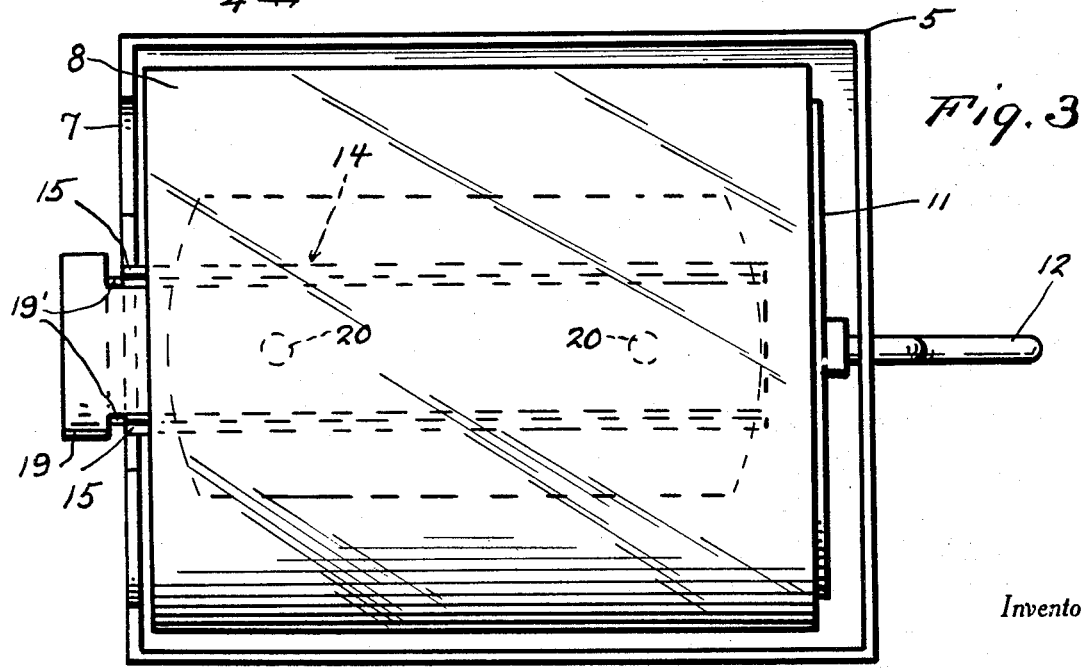
Inventor
*Samuel Rhea*
By *Clarence A. O'Brien*
Attorney July 11, 1933.  S. RHEA  1,918,132

RAZOR BLADE SHARPENER

Filed March 25, 1932  3 Sheets-Sheet 3

Inventor
Samuel Rhea
By Clarence A. O'Brien
Attorney

Patented July 11, 1933

1,918,132

UNITED STATES PATENT OFFICE

SAMUEL RHEA, OF MENDOTA, ILLINOIS

RAZOR BLADE SHARPENER

Application filed March 25, 1932. Serial No. 601,249.

The present invention relates to razor blade sharpening devices and has for its prime object the provision of a device for maintaining a keen edge upon a safety razor blade by which the life of a blade may be prolonged.

Another very important object of the invention resides in the provision of a sharpener of this nature which is simple in its construction, inexpensive to manufacture, easy to manipulate, thoroughly efficient and reliable in use and operation, adjustable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 2 is a vertical longitudinal section therethrough.

Figure 3 is a top plan view thereof with the cover removed.

Figure 1:
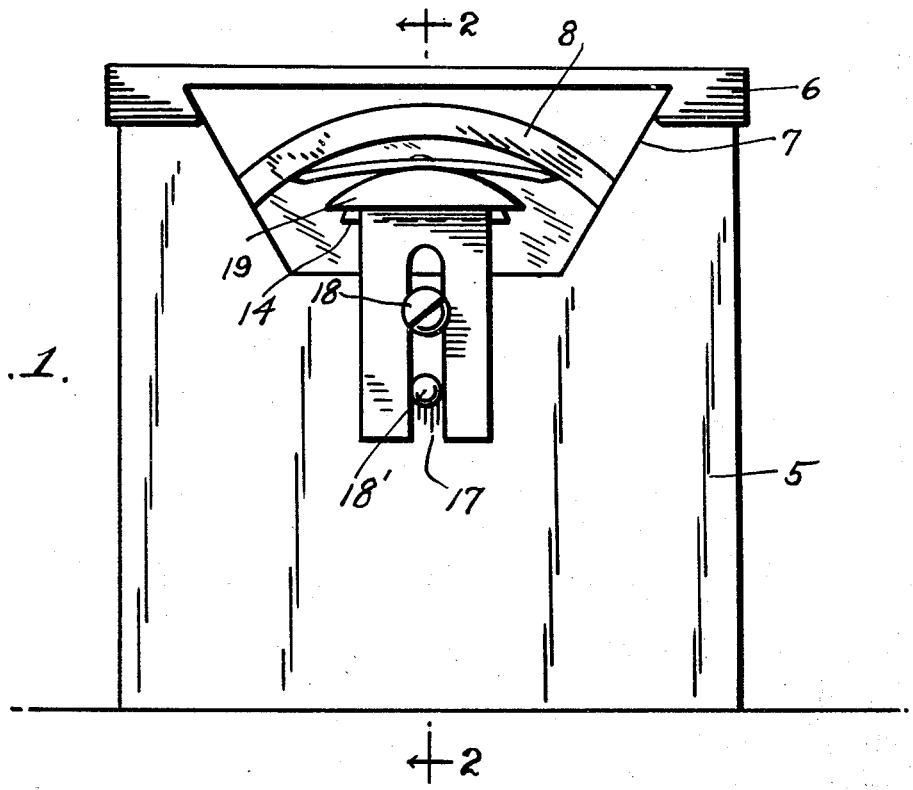
Figure 1 is an end elevation of a device embodying the features of my invention.
Figure 8:
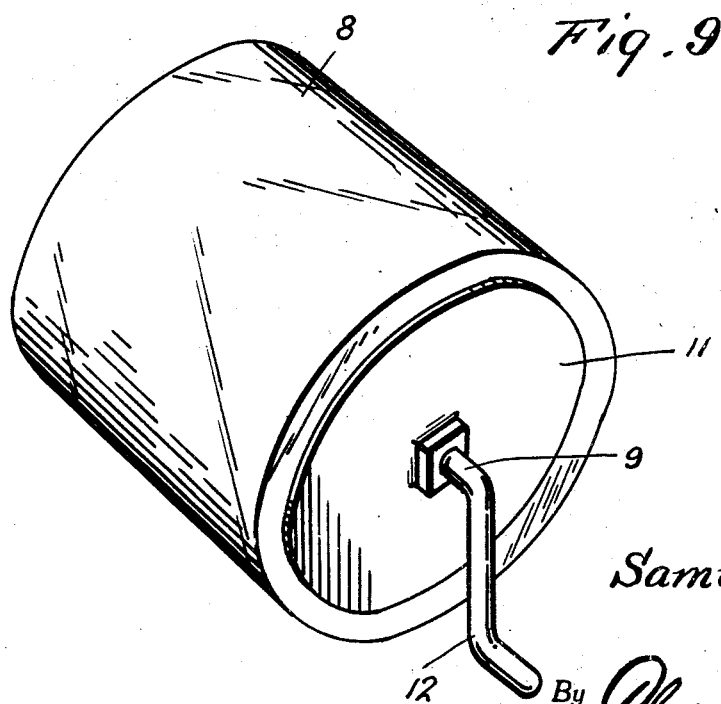
Figure 8 is a perspective view of a cylindrical body.
Figure 9:
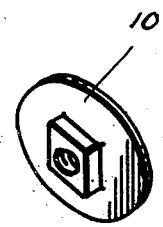
Figure 9 is a perspective view of a nut.
Figure 4:
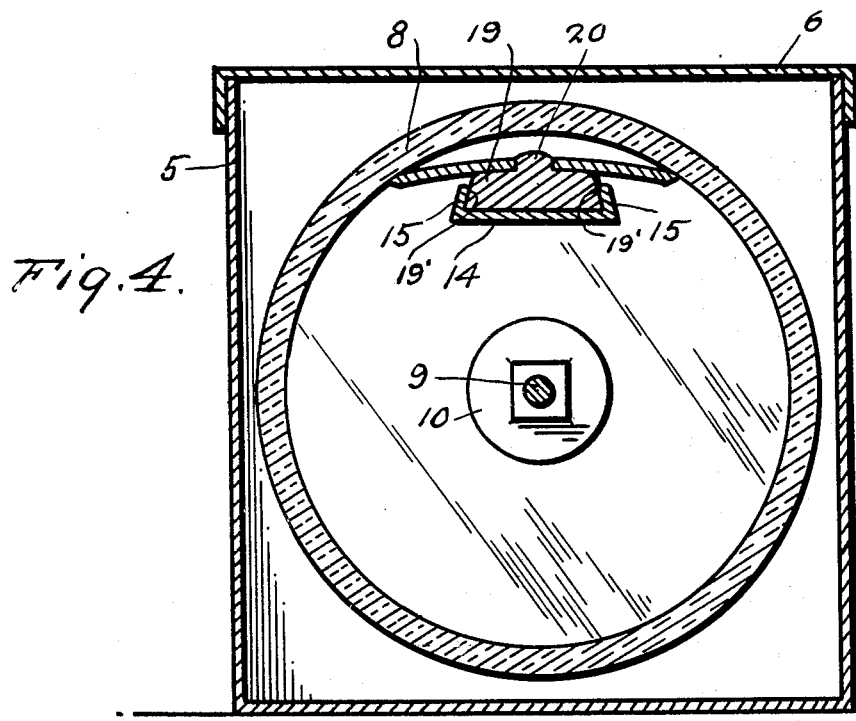
Figure 4 is a vertical transverse section taken substantially on the line 4—4 of Figure 2.
Figures 5, 6:
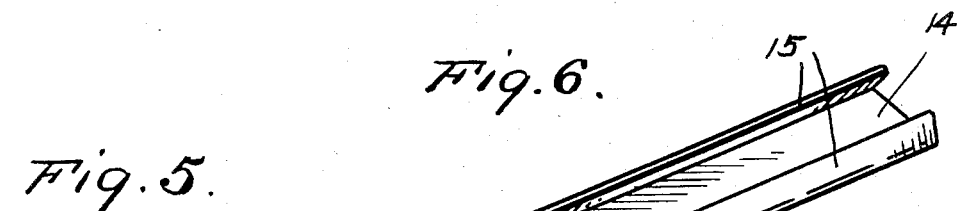
Figure 5 is a perspective view of a holder bar.
Figure 6 is a perspective view of a holder frame.
Figure 7:
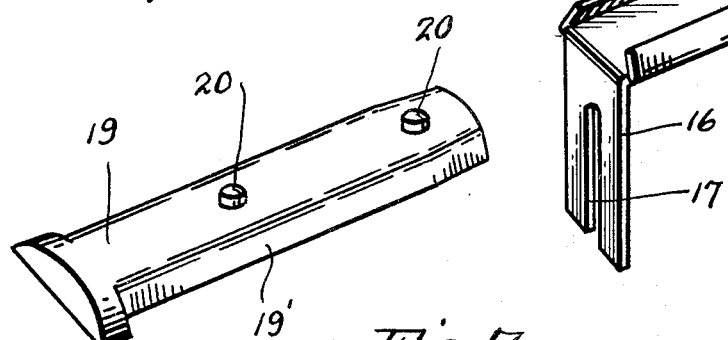
Figure 7 is a perspective view of a crank shaft.

Referring to the drawings in detail, it will be seen that numeral 5 denotes a casing with a removable lid 6. Extending down from the top edge of one end of the frame is an opening 7. Numeral 8 denotes a cylindrical glass body open at one end. A shaft 9 extends through the center of the closed end of this body 8 to be disposed along the axis thereof and clamped to said closed end by clamp nuts 10 and 11 threaded on the shaft 9.

The shaft 9 is journalled through openings in the ends of the casing 5 and on one end opposite to that having the opening 7, the shaft 9 is formed with a crank 12 for turning the cylindrical glass body. A holder frame comprises an oblong plate 14 with flanges 15 on the longitudinal edges thereof inclining upwardly toward each other. On one end of the plate 14 is formed a depending plate 16 having a longitudinal slot 17 for receiving a bolt 18 through the head of the casing 5 at the opening 7 so that the holder frame may extend through the opening into the body 8. A holder bar 19 has a rounded upper surface with a pair of lugs 20 rising therefrom. A razor blade is placed on the bar 19 and then the bar 19 with its beveled side edges 19' is slid into the frame 14 thereby causing the edges of the blade to be tensionally engaged with the interior surface of the cylindrical glass body. This tension may be varied by loosening the bolt 18 and adjusting the frame radially with respect to the cylindrical body. Extending outwardly from the end of the casing in which is disposed the bolt 18 is a lug 18' which extends into the slot 17 and therefore prevents the turning of the frame.

When the razor blade has been properly placed and tensioned as just described the crank 12 is turned to rotate the cylinder thereby sharpening the blades.

It is thought that the construction, operation, utility and advantages of this invention will now be clearly understood without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A razor blade sharpening device comprising a cylindrical body open at one end and having the other end closed, a shaft extending through the center of the closed end and fixed thereto, a casing in which the body is disposed and in which said shaft is rotatably mounted, a crank on one outer end of the shaft for imparting rotary motion to the body, and razor blade supporting means carried by said casing for supporting a razor blade with its knife edge or edges in bearing contact with the inner periphery of said cylindrical body, said razor blade supporting means comprising a frame, means for supporting a frame to be disposed inside the body and adjustable radially thereof, a bar having slidable engagement with said frame for supporting a blade in bearing contact with the interior periphery of the body.

2. A razor blade sharpening device comprising a cylindrical body, means for rotatably mounting the body, means for rotating the body, and razor blade supporting means in the body for holding a razor blade with its knife edge or edges in bearing contact with the inner periphery of the body, said razor blade supporting means comprising a frame, means for supporting the frame to be disposed inside the body and adjustable radially thereof, and a bar having slidable engagement with said frame for supporting a blade in bearing contact with the interior periphery of the body.

In testimony whereof I affix my signature.

SAMUEL RHEA.